US006560977B1

(12) United States Patent
Hupfel et al.

(10) Patent No.: US 6,560,977 B1
(45) Date of Patent: May 13, 2003

(54) VEHICLE HVAC EVAPORATOR TEMPERATURE PROBE ASSEMBLY METHOD

(75) Inventors: Eric J. Hupfel, Oxford, MI (US); Robert Oliver, Harrison Township, MI (US)

(73) Assignee: Valeo Climate Control Corp.

( * ) Notice: Subject to any disclaimer, the term of this patent is extended or adjusted under 35 U.S.C. 154(b) by 0 days.

(21) Appl. No.: 10/037,640

(22) Filed: Nov. 9, 2001

(51) Int. Cl.[7] .......................... G01D 21/00; G01K 1/08
(52) U.S. Cl. ...................... 62/129; 29/726; 73/866.5; 374/141; 374/209
(58) Field of Search ................................ 374/141, 145, 374/209; 62/216, 227, 129; 73/866.5; 29/726

(56) References Cited

U.S. PATENT DOCUMENTS 6,089,110 A * 7/2000 Pallotta et al. ............ 62/129 X
6,328,468 B1 * 12/2001 Nagano et al. ............. 374/141

* cited by examiner

Primary Examiner—William Wayner
(74) Attorney, Agent, or Firm—J. Gordon Lewis

(57) ABSTRACT

An HVAC evaporator core temperature probe apparatus and assembly method in which the temperature probe has a seal member mounted intermediate opposed ends. First and second apertures are formed in the HVAC housing, one adjacent the mounted position of the probe sensing end and the other end spaced from the access aperture and receiving the seal member to dispose the electrical connector on the other end of the probe conductor exteriorly of the housing. The temperature probe is inserted in the evaporator prior to mounting the evaporator core in the HVAC housing. The seal member is snap mounted in the first aperture in the housing to dispose the electrical connector exteriorly of the housing. After separation of the probe sensing end from the evaporator core and separation of the seal member from the first aperture, an existing temperature probe is removable through the second aperture in the housing.

14 Claims, 5 Drawing Sheets

VEHICLE HVAC EVAPORATOR TEMPERATURE PROBE ASSEMBLY METHOD

BACKGROUND

In a modem automotive vehicle, the HVAC unit includes an evaporator core mounted in a housing which receives an air steam from a blower motor also mounted in the housing. Since prolonged continuous use of the air conditioning portion of the HVAC unit can cause freezing of the evaporator core, a temperature probe is typically inserted in the core fins at the location of the coldest spot on the evaporator core. The probe is in the form of thermocouple having a flexible conduction extending out of a rigid probe sensing head. As shown in FIG. 1, the thermocouple conduction extends to a plug which is mounted in an opening in the HVAC housing generally immediately adjacent the position of the probe. An electrical connector is also mounted on the plug, as shown in FIG. 2, for connection to an external conductor for transmission of the probe sense output to a remote controller. This enables the operation time of the HVAC compressor to be controlled to prevent freezing of the evaporator core.

However, serviceability of the probe is an essential requirement in that the probe must be capable of easy removal and replacement during the expected long term use of the vehicle. Easy access to the probe and/or plug from underneath the instrument panel is necessary if the time consuming and costly need to remove the entire instrument panel in order to replace the HVAC core temperature probe is to be avoided.

As shown in FIGS. 1 and 2, and partially in FIG. 6, certain HVAC housing designs, can result in a minimal amount of space available for access to the probe plug. The elongated shape of the probe sensing head requires a sufficient space to pull the probe out through the access opening in the housing. When such space is not available, as shown in the example depicted in FIGS. 1 and 2, a vehicle no-build condition exists.

Thus, it would be desirable to provide a vehicle HVAC evaporator core probe assembly and assembly method which provides easy serviceability of the temperature probe at any time during the life of the vehicle without requiring removal of the entire instrument panel.

SUMMARY

The present invention is a vehicle HVAC evaporator temperature probe apparatus and assembly method.

In one aspect of the invention, the HVAC evaporator probe temperature apparatus is adapted for mounting in an HVAC housing having an evaporator core, a first aperture formed in the housing, and a second aperture formed in the housing spaced from the first aperture and disposed in proximity with a cold temperature location in the core. The apparatus includes a temperature probe having a sensing end adapted to be inserted into an evaporator core, a conductor having first and second ends, the first end connected to the temperature probe sensing end, an electrical connector connected to the second end of the conductor, and a seal member mounted on the conductor intermediate the first and second ends for sealingly mounting the conductor in the first aperture such that the electrical connector is disposed exteriorly of the housing in which the temperature probe is mounted.

Preferably, the seal member is fixedly mounted on the conductor and formed for a snap-fit mount in the first aperture.

In another aspect, the present invention is an HVAC apparatus which includes a housing having an exterior wall, an evaporator core mounted in the housing, a first aperture formed in the exterior wall of the housing, a temperature probe having a sensing end mounted in the evaporator core, an electrical conductor having first and second ends, the first end connected to the temperature probe sensing end, an electrical connector connected to the second end of the conductor, and a seal member mounted on the conductor intermediate the first and second ends for sealingly mounting the conductor in the first aperture such that the electrical connector is disposed exteriorly of the housing in which the temperature probe is mounted.

In this aspect, the seal member is preferably fixedly mounted on the conductor and formed for a snap-fit mount in the first aperture.

A second aperture is also formed in the wall spaced from the first aperture. The second aperture is disposed in proximity with the mounting position of the temperature probe sensing end in the evaporate core and removably receive a closure member.

The present invention also defines a method for mounting an HVAC evaporate core temperature probe in an HVAC housing having a first aperture in an exterior wall. The method comprises the steps of:

inserting a temperature probe sensing end into the evaporator core prior to mounting the evaporator core in the housing;

mounting the evaporator core in the housing;

routing an electrical conductor extending from the probe sensing end through the housing such that an electrical connector connected to an opposite end of the conductor is disposed exteriorly through the first aperture in the housing wall; and sealingly closing the first aperture in the housing wall.

Preferably, the method also includes the step of pre-mounting the seal member on the conductor. The pre-mounting of the seal member also includes the step of fixedly mounting the seal member on the conductor.

The method also includes the step of:

forming a second aperture in the housing wall spaced from the first aperture and disposed in proximity with the mounting position of the temperature probe sensing end in the evaporator core when the evaporator core is mounted in the housing; and withdrawing the temperature probe sensing end from the evaporator core and the housing through the second aperture.

In this aspect, the method also includes the step of mounting a removable closure member in the second aperture to sealing close the second aperture.

The present method is also devised for removing a temperature probe from the evaporator core and comprises the steps of:

forming a second aperture in the housing wall spaced from the first aperture and disposed in proximity with the mounting position of the temperature probe sensing end in the evaporator core when the evaporator core is mounted in the housing; and withdrawing the temperature probe sensing end from the evaporator core and the housing through the second aperture.

The present method also is devised for installing a new probe assembly in the housing when an existing temperature probe assembly is to be removed from the housing. In this aspect, the method further comprises the step of:

installing a new probe assembly in the housing when an existing temperature probe assembly is to be removed from the housing, the method comprising the steps of:

connecting the sensing end of a new temperature probe apparatus to a portion of the existing temperature probe in the housing;

pulling the new probe assembly into the housing through the first aperture simultaneous with removing the existing probe apparatus through the second aperture in the housing;

separating the new probe apparatus from the old probe apparatus;

mounting the sensing end of the temperature probe in the evaporator core;

mounting the seal member in the first aperture in the housing; and mounting a seal member in the second aperture in the housing.

The apparatus and method of the present invention uniquely enable an HVAC evaporator core temperature probe to be expeditiously mounted in an HVAC housing while enabling the temperature probe to be easily removed from the housing, while the housing is still mounted in its mounting position in a vehicle through an easily accessible opening. The present invention also defines a unique method of mounting a replacement temperature probe in an HVAC housing when an existing temperature probe is to be removed from the housing. The method of mounting a new temperature probe in the housing takes place simultaneously with removal of the existing temperature probe from the housing thereby reducing repair time and labor costs.

BRIEF DESCRIPTION OF THE DRAWING

The various features, advantages and other uses of the present invention will become more apparent by referring to the following detailed description and drawing in which.

DETAILED DESCRIPTION

Figure 1:
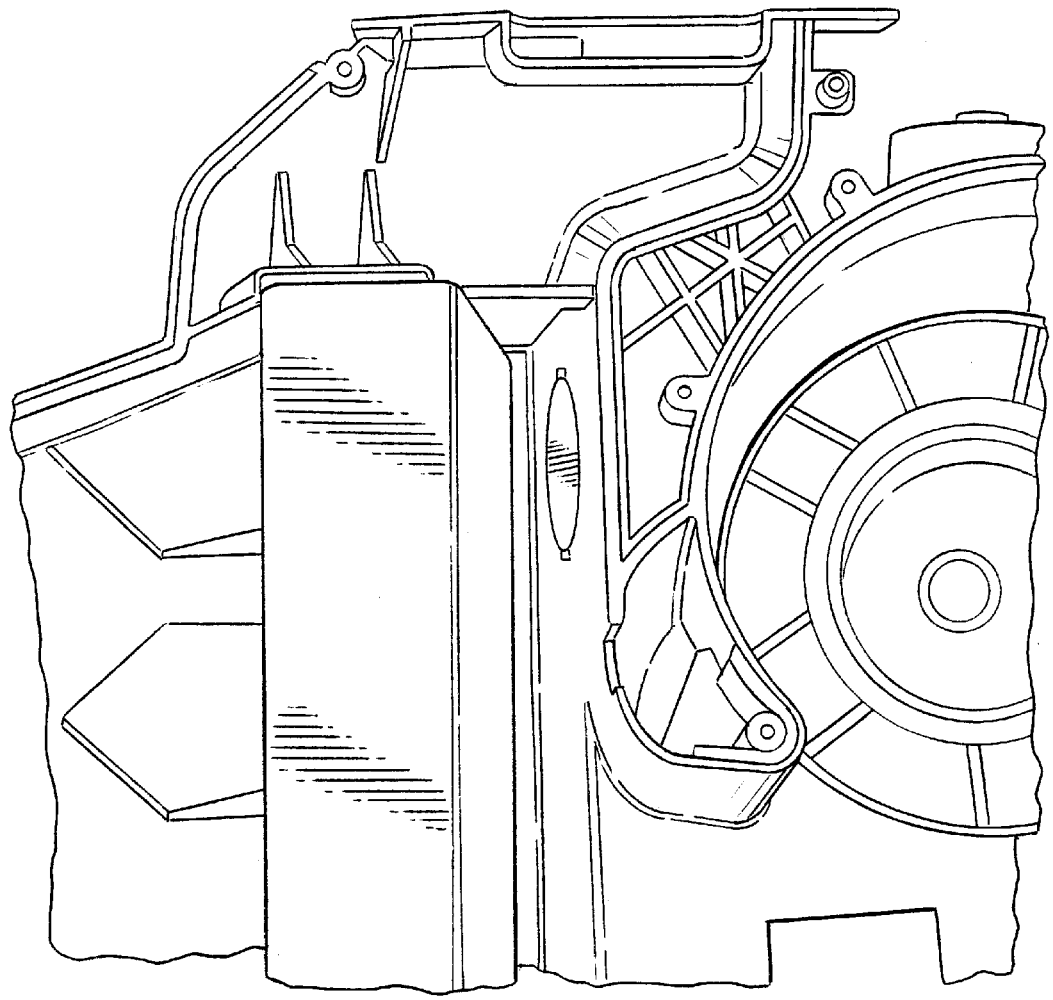
FIG. 1 is a plan view of a prior art HVAC housing with the upper housing part removed for clarity.

Referring now the drawing and to FIGS. 3–6 in particular, there is depicted an HVAC evaporator core temperature probe assembly according to the present invention which is mounted in the HVAC housing by a unique assemble process to simplify later removal of the temperature probe from the evaporator core.

Figure 4:
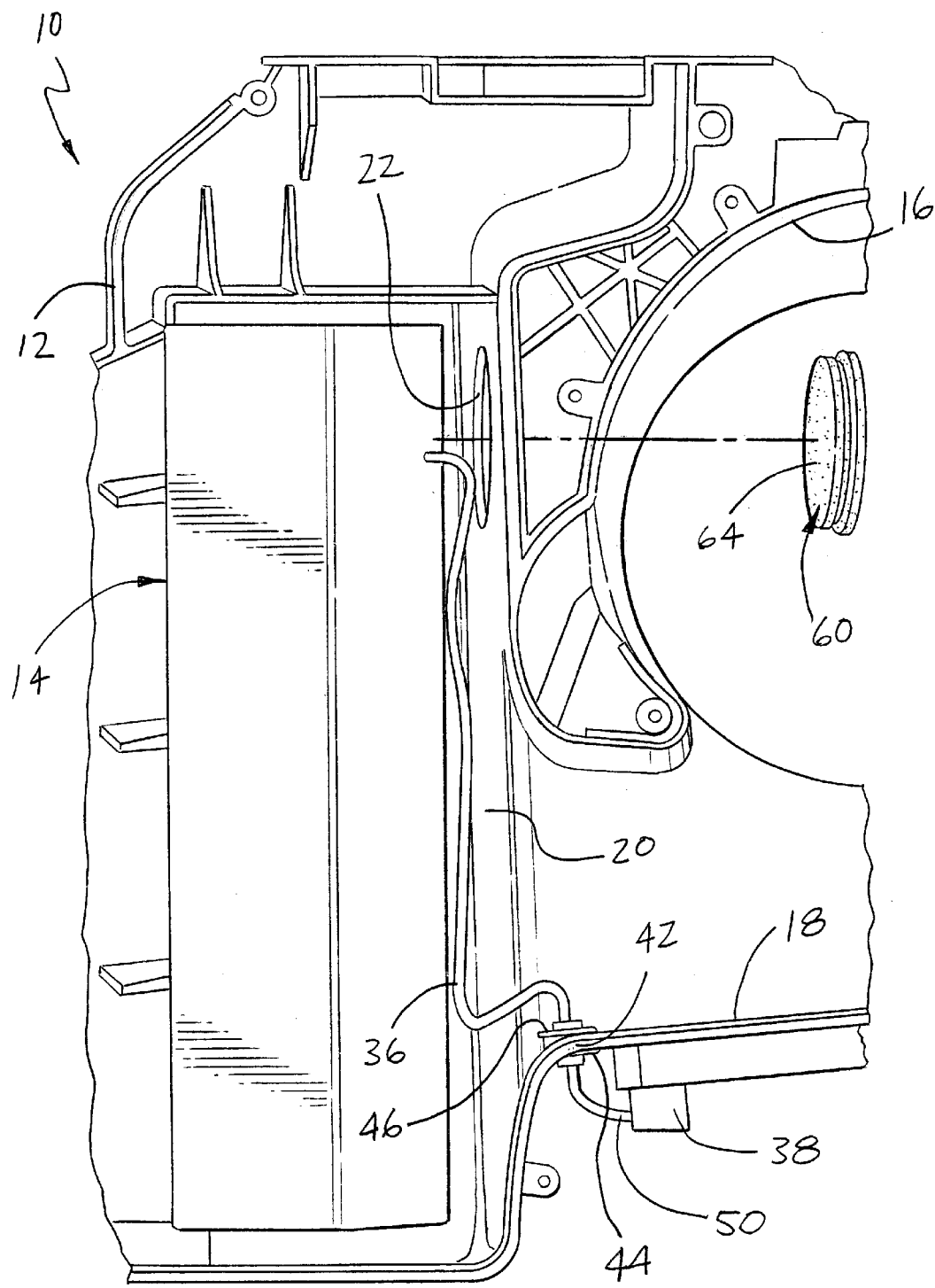
FIG. 4 is a partially exploded, plan view of an HVAC evaporator core housing with the upper housing part removed, which incorporates a core temperature assembly according to the present invention.
Figure 5:
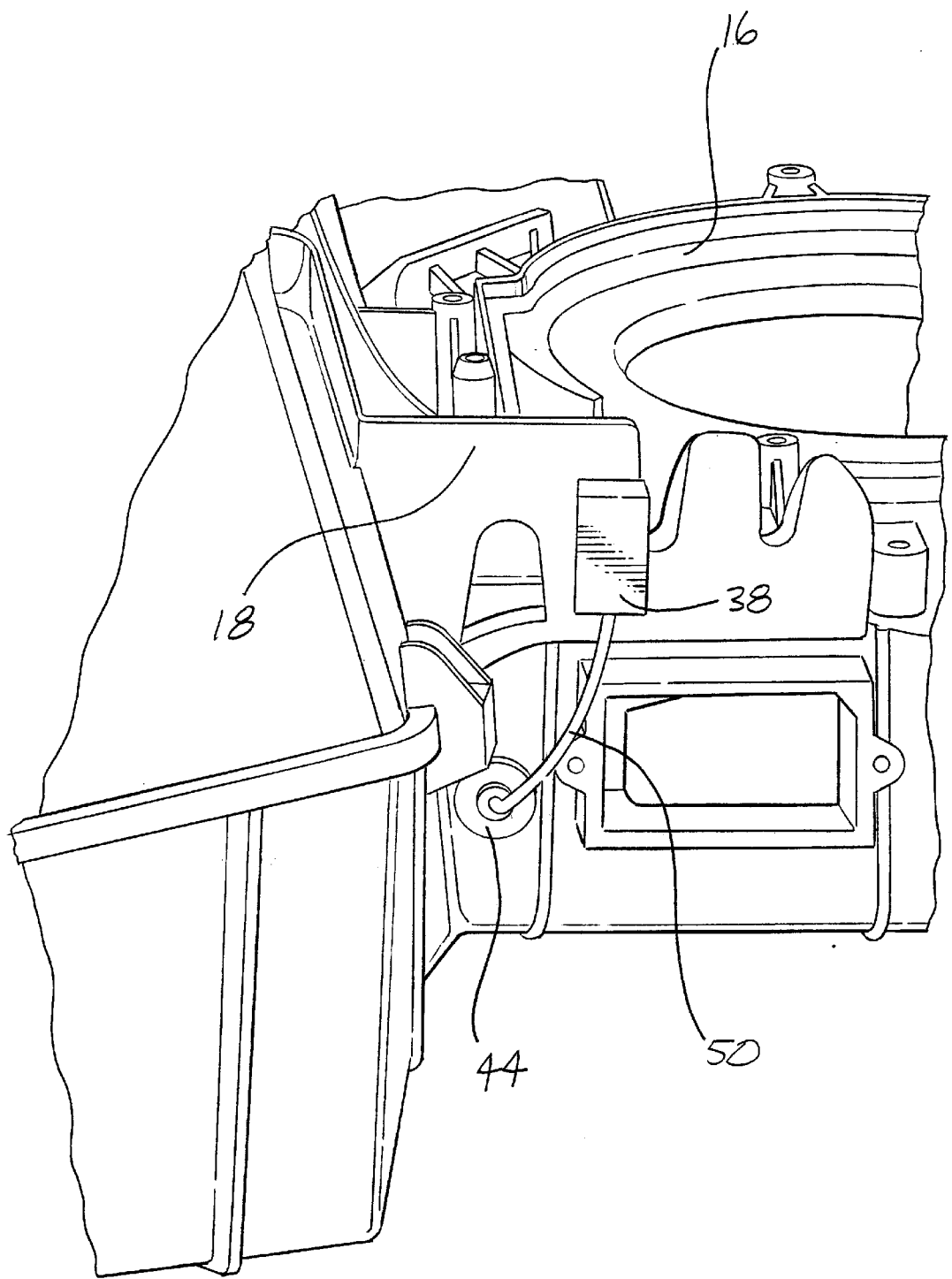
FIG. 5 is a side elevational view of the housing shown in FIG. 4.

A typical vehicle HVAC assembly 10 includes a housing formed of first and second joined parts, with only the lower housing 12 shown in FIGS. 4 and 5 for clarity. The lower housing 12 has an irregular shape with a number of air flow passages and mounting locations for various components, including an evaporator core 14 and a blower motor, not shown, which fits into a recess 16 in the housing part 12.

As shown in FIG. 4, a wall 18 is formed in the lower housing 12 and mates with a similar wall in the upper housing, not shown, to form a passage which directs a high velocity air stream generated by the blower motor flows on the evaporator core 14. A wall 20 is disposed of the lower housing 12 adjacent to the evaporator core 14. An access aperture or opening 22 is formed in the wall 20 generally adjacent to the coldest spot on the evaporator core 14. A temperature probe assembly 30 having a probe sensing end or head 32 in the form of a rigid sleeve carrying an internal thermocouple wire 33 is mounted between spaced fins in the evaporator core 14. An enlarged opening or bore may be pre-formed between two adjacent fins in the evaporator core 14 during manufacture of the core 14 or the rigid end portion 32 of the probe assembly 30 forced into the desired cold spot location on the core 14.

Figure 3:
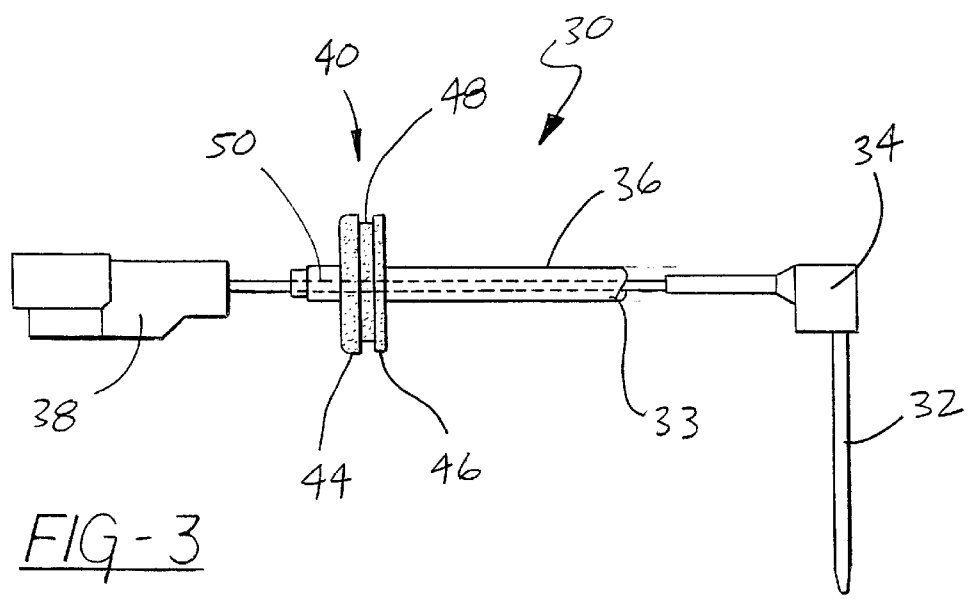
FIG. 3 is a side elevational view of the evaporator core temperature probe assembly according to the present invention.

Although not shown in FIG. 4, but depicted in FIG. 3, a housing 34 is mounted on one end of the rigid end 32 of the probe assembly 30 for routing the thermocouple wire through an insulated covering or sheath 36 outwardly from the connector 34. The thermocouple conductor 33 extends to an electrical termination connection with an electrical connector 38 at one end. Hereafter, both the thermocouple wire 33 and the sheath 34 will collectively be referred to as the thermocouple conductor 33.

According to one feature of the present invention, a seal member 40 in the form of a resilient grommet is mounted intermediate the ends of the thermocouple conductor 33. Preferably, the seal member or grommet 40 is fixedly mounted in a specific position along the length of the sheath 36 generally in proximity with the connector 38. Inner angled ribs may be provided to fix the grommet 40 in position on the sheath 36.

The grommet 40 is formed of a resilient material which is capable of sealing an aperture 42 formed in the lower housing 12 after an end portion 50 of the thermocouple conductor 33 and the connector 38 have passed through the aperture 42, as shown in FIG. 4.

It should be noted that the aperture 42 is spaced from the access aperture 22 and is located, by example only, in a wall portion of the lower housing forming part of the wall 18.

The grommet 40 is formed with two enlarged diameter lobes 44 and 46 which are spaced apart by a smaller diameter collar 48. The collar 48 fits within the inner diameter of the aperture 42 with the enlarged diameter lobes 44 and 46 disposed on opposite sides of the wall 18 as shown in FIGS. 4 and 5.

The short end length 50 of the sheath 36 and thermocouple conductor 33 project outwardly from the lobe 44 of the grommet 40. This short length 50 is disposed exteriorly of the wall 18 so as to space the connector 38 a short distance away from the wall 18 to allow easy access to the connector 38 for connection to an external conductor and mating connector, not shown, which runs to a vehicle controller.

The assembly or mounting of the temperature probe apparatus 30 in the lower housing 12 will now be described in conjunction with FIGS. 4 and 5.

In a first step, the rigid end portion 32 of the probe assembly 30 is inserted into the specific cold spot location between fins in the evaporator core 14 before the core 14 is mounted in the lower housing 12.

With the evaporator core 14 mounted in the lower housing 12, the thermocouple conductor 33 is routed along the inside of the wall 20 so as to enable the connector 38 and the short length end portion 50 of the thermocouple conductor 33 to be passed through the aperture 42 in the wall 18 of the housing part 12. The connector 38 is inserted through the aperture 42 until the seal member or grommet 40 is placed in proximity with the aperture 42. The lobe 44 of the grommet 40 compresses as the grommet 40 is snap fit through the smaller diameter aperture 42 until the lobe 44 passes through the aperture 42 and expands back to its original size thereby placing the collar 48 within the aperture and the lobes 44 and 46 on opposite sides of the wall 18 of the lower housing 12. As it is preferred that the grommet 40 is fixed in position on the sheath 36, this mounting arrangement fixes the position of the connector 38 exteriorly of the housing part 12.

It should also be noted in this mounting position, the other end of the thermocouple conductor 33 and the probe connector head 34 are located immediately adjacent the access aperture 22 in the wall 20. A removable access cover 60 is disposed in the aperture 22. The access cover 60 can take a number of different forms. In one aspect, the access cover 60 can be in the form of a severable portion of the wall 20 defined by score or perforation lines in the wall 20. This allows the access cover 60 to be punched out of the wall 20 for removal of a temperature probe from the core 14.

The access cover 60 may also be in the form of a plug 64 shown in FIG. 4 which is snap mountable in the access aperture 22. It should be noted that a plug similar to a plug 64 may also be necessary if the severable access cover aspect is employed so as to close the aperture 22 after a new probe apparatus has been mounted in the core 14, as described hereafter.

When it is necessary to remove an existing probe assembly 30 from the HVAC unit 10, a unique removal method is provided according to the present invention which uses the unique construction of the probe apparatus 30.

As an initial and possibly optional step, the blower motor mounted in the recess 16 in the top housing 12 is removed from the top housing 12. This is accomplished by removing bolts which secure the blower motor to the underside of the opposed, bottom housing which is facing downward in its normal vehicle passenger compartment mounting position. The access cover 60 is then removed from the wall 20 in the housing part 12 opening the aperture 22.

The next step in the present removal method is to disengage the grommet 40 from the wall 18 to enable the connector 38 to be pushed or pulled through the aperture 42 and withdrawn along with the entire sensing probe head 32 through the access aperture 22. The entire probe apparatus 30 is then pulled through the access aperture 22.

Figure 2:
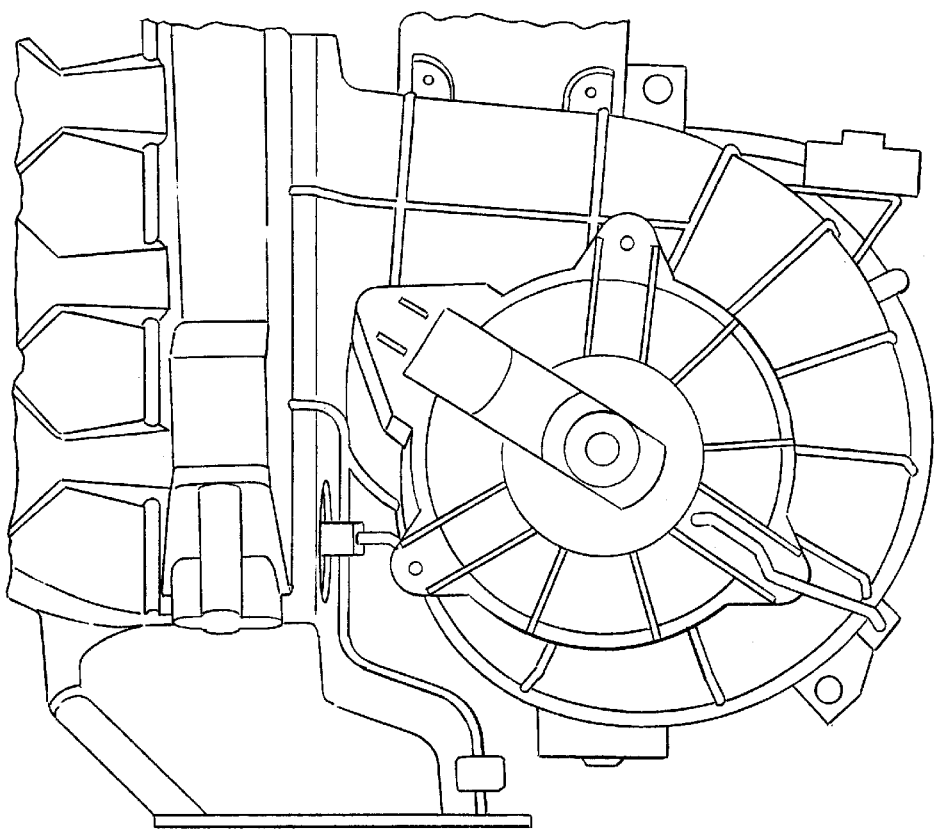
FIG. 2 is a bottom view of the prior art HVAC housing shown in FIG. 1.
Figure 6:
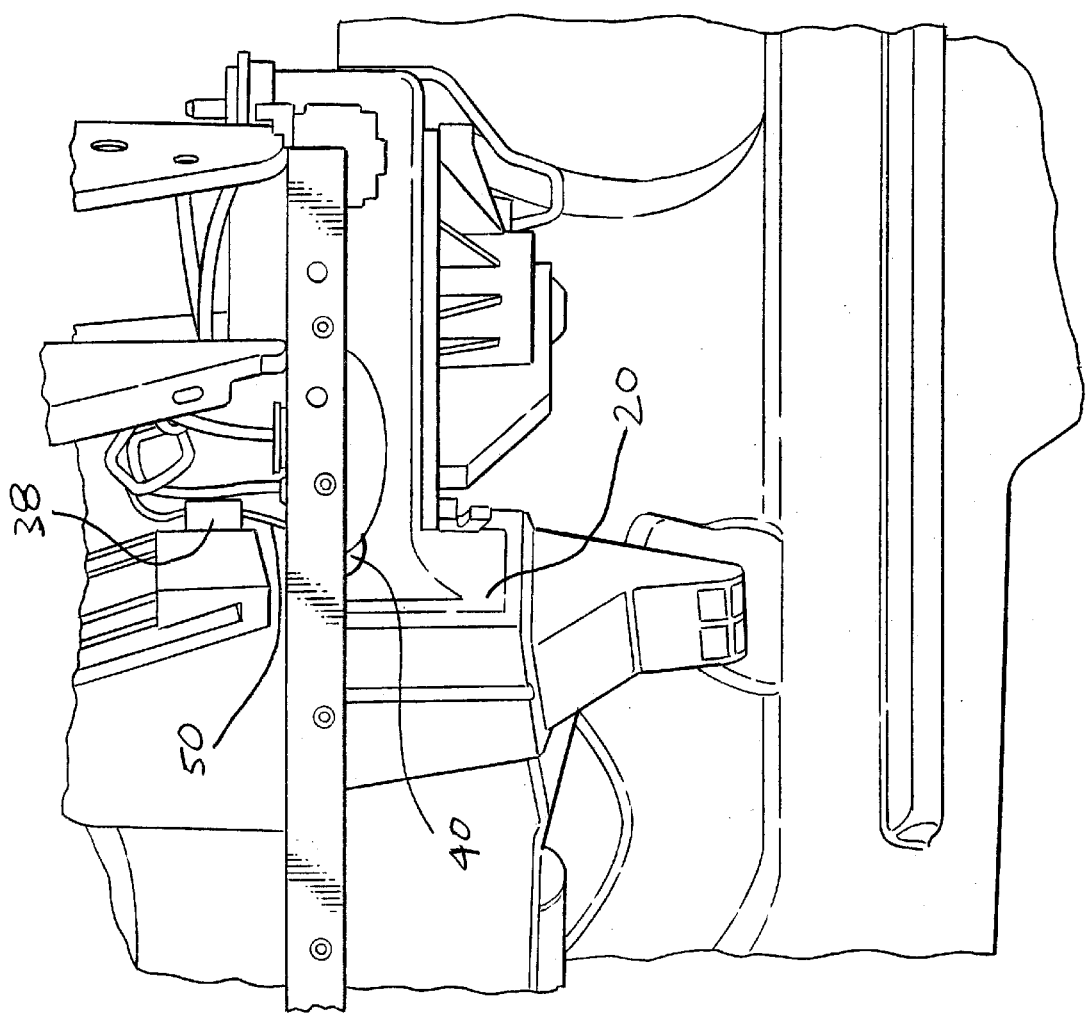
FIG. 6 is a lower side of the housing showing the prior art temperature probe connector position relative to the temperature probe connector position according to the present invention.

FIG. 6 depicts the wide open access space available to remove the core probe assembly 30 from the HVAC housing mounted in a vehicle. This is contrasted with the smaller, mostly inaccessible space at the bottom of the housing for the prior art probe shown in detail in FIGS. 1 and 2.

A new probe apparatus 30 can then be mounted in the housing part 12. To facilitate an easy and quick installation of a new probe assembly 30, the sensing head 32 of the new probe assembly 30 is temporarily connected to the connector 38 of the old probe assembly 30 mounted in the evaporator core 14. This can be accomplished by means of tape, for example. This enables the entire new probe apparatus 30 to be inserted through the aperture 42 and pulled to its mounting position simultaneously with removal of the old probe apparatus 30 from the top housing 12.

When the sensing end 32 of the new probe assembly 30 is adjacent to the cold spot in the core 14 or has been pulled out through the access aperture 22, the new probe assembly 30 is separated from the connector 38 of the old probe assembly 30 and the sensing end 32 of the new probe assembly 30 inserted into the desired cold spot location in the evaporator core 14. The access cover 60 is then inserted into the access aperture 22 to seal the access aperture 22. Likewise, the grommet 40 on the new probe assembly conductor 36 is snapped into the aperture 42 leaving the connector 36 disposed exteriorly of the top housing 12 for connection to a mating connector, not shown.

In summary, there has been disclosed a unique HVAC evaporator core temperature probe apparatus and mounting method which can be easily installed in and removed from an HVAC housing while the housing is mounted within a vehicle.

What is claimed is:

1. An HVAC evaporator probe temperature apparatus for mounting in an HVAC housing having an evaporator core, a first aperture formed in the housing, and a second aperture formed in the housing spaced from the first aperture, and disposed in proximity with a cold temperature location in the core, the apparatus comprising:

a temperature probe having a sensing end adapted to be inserted into an evaporator core;

a conductor having first and second ends, the first end connected to the temperature probe sensing end;

an electrical connector connected to the second end of the conductor; and a seal member mounted on the conductor intermediate the first and second ends for sealingly mounting the conductor in the first aperture such that the electrical connector is disposed exteriorly of the housing in which the temperature probe is mounted.

2. The temperature probe apparatus of claim 1 wherein: the seal member is fixedly mounted on the conductor.

3. The temperature probe apparatus of claim 1 wherein: the seal member is snap-fit mounted in the first aperture.

4. An HVAC apparatus comprising:

a housing having an exterior wall;

an evaporator core mounted in the housing;

a first aperture formed in the exterior wall of the housing;

a temperature probe having a sensing end mounted in the evaporator core;

an electrical conductor having first and second ends, the first end connected to the temperature probe sensing end;

an electrical connector connected to the second end of the conductor; and a seal member mounted on the conductor intermediate the first and second ends for sealingly mounting the conductor in the first aperture such that the electrical connector is disposed exteriorly of the housing in which the temperature probe is mounted.

5. The HVAC apparatus of claim 4 wherein: the seal member is fixedly mounted on the conductor.

6. The HVAC apparatus of claim 4 wherein: the seal member is snap-fit mounted in the first aperture.

7. The HVAC apparatus of claim 4 further comprising:

a second aperture formed in the wall spaced from the first aperture, the second aperture disposed in proximity with the mounting position of the temperature probe sensing end in the evaporator core; and a closure member removably mounted in the second aperture.

8. A method of mounting an HVAC evaporator core temperature probe in an HVAC housing having a first aperture in an exterior wall, the method comprising the steps of:

inserting a temperature probe sensing end into the evaporator core prior to mounting the evaporator core in the housing;

mounting the evaporator core in the housing;

routing an electrical conductor extending from the probe sensing end through the housing such that an electrical connector connected to an opposite end of the conductor is disposed exteriorly through the first aperture in the housing wall; and sealingly closing the first aperture in the housing wall.

9. The method of claim 8 wherein the step of sealingly closing the first aperture in the wall comprises the step of:

premounting a seal member on the conductor.

10. The method of claim 9 wherein the step of premounting the seal member on the conductor comprises the step of:

fixedly mounting the seal member on the conductor.

11. The method of claim 9 further comprising the step of:

forming a second aperture in the housing wall spaced from the first aperture and disposed in proximity with the mounting position of the temperature probe sensing end in the evaporator core when the evaporator core is mounted in the housing; and withdrawing the temperature probe sensing end from the evaporator core and the housing through the second aperture.

12. The method of claim 11 further comprising the step of:

mounting a removable closure member in the second aperture to sealingly close the second aperture.

13. The method of claim 12 further including the steps of removing a temperature probe from the evaporator core comprising the steps of:

separating the removable closure member from the second aperture;

separating the seal member from the first aperture;

removing the probe sensing end from the evaporator core; and removing the temperature probe sensing end, the temperature probe conductor, the seal member and the electrical connector from the housing through the second aperture.

14. The method of claim 13 further comprising the steps of installing a new probe assembly in the housing when an existing temperature probe assembly is to be removed from the housing, the method comprising the steps of:

connecting the sensing end of a new temperature probe apparatus to a portion of the existing temperature probe in the housing;

pulling the new probe assembly into the housing through the first aperture simultaneous with removing the existing probe apparatus through the second aperture in the housing;

separating the new probe apparatus from the old probe apparatus;

mounting the sensing end of the temperature probe in the evaporator core;

mounting the seal member in the first aperture in the housing; and mounting a seal member in the second aperture in the housing.

\* \* \* \* \*